US012064978B2

(12) United States Patent
Kubota

(10) Patent No.: US 12,064,978 B2
(45) Date of Patent: Aug. 20, 2024

(54) POSITIONING STRUCTURE, LIQUID JET HEAD, AND LIQUID JET RECORDING DEVICE

(71) Applicant: SII Printek Inc., Chiba (JP)

(72) Inventor: Yuzuru Kubota, Chiba (JP)

(73) Assignee: SII PRINTEK INC., Chiba (JP)

( * ) Notice: Subject to any disclaimer, the term of this patent is extended or adjusted under 35 U.S.C. 154(b) by 145 days.

(21) Appl. No.: 17/969,965

(22) Filed: Oct. 20, 2022

(65) Prior Publication Data

US 2023/0126898 A1 Apr. 27, 2023

(30) Foreign Application Priority Data

Oct. 25, 2021 (JP) ................................ 2021-173923

(51) Int. Cl.
*B41J 2/14* (2006.01)
*B41J 2/235* (2006.01)
*B41J 25/304* (2006.01)

(52) U.S. Cl.
CPC .................................. *B41J 25/304* (2013.01)

(58) Field of Classification Search
CPC . B41J 2/145; B41J 2/14; B41J 2/14024; B41J 2/235; B41J 29/02; B41J 25/304; B41J 2002/14362
See application file for complete search history.

(56) References Cited

U.S. PATENT DOCUMENTS 9,802,409 B2 * 10/2017 Yamabe .................. B41J 2/145
2002/0024554 A1 * 2/2002 Tominaga ............. B41J 2/1752 347/49
2005/0168514 A1 * 8/2005 Ueda ...................... B41J 2/2135 347/20
2012/0147094 A1 * 6/2012 Hagiwara ............. B41J 25/003 29/890.1
2014/0168319 A1 * 6/2014 Moreau ................ B41J 2/04586 347/49
2016/0375707 A1 * 12/2016 Elferink .................. B41J 29/02 347/40

FOREIGN PATENT DOCUMENTS

JP 2014-014972 A 1/2014

* cited by examiner

*Primary Examiner* — Jason S Uhlenhake
(74) *Attorney, Agent, or Firm* — Crowell & Moring LLP

(57) ABSTRACT

A liquid jet head is accurately positioned to a head installation part of a liquid jet recording device. A positioning structure includes a positioning pin provided to a carriage, and a positioning mechanism provided to an inkjet head, wherein the positioning mechanism includes a contact member having contact with the positioning pin, and a displacement mechanism for displacing the contact member along a displacement axis extending in an oblique direction crossing a direction perpendicular to an installation surface of head installation part, and a contact part of the positioning pin is formed to have a curved surface shape taking a first intersecting axis crossing the installation surface as a central axis, and a contact part of the contact member is formed to have a curved surface shape taking a second intersecting axis as a central axis, the second intersecting axis crossing an imaginary plane including a displacement axis and a vertical axis (the first intersecting axis) extending in a direction perpendicular to the installation surface, and the second intersecting axis being nonparallel to the first intersecting axis.

11 Claims, 12 Drawing Sheets

POSITIONING STRUCTURE, LIQUID JET HEAD, AND LIQUID JET RECORDING DEVICE

RELATED APPLICATIONS

This application claims priority to Japanese Patent Application No. 2021-173923, filed on Oct. 25, 2021, the entire content of which is incorporated herein by reference.

BACKGROUND OF THE INVENTION

1. Field of the Invention

The present disclosure relates to a positioning structure, a liquid jet head, and a liquid jet recording device.

2. Description of the Related Art

In JP-A-2014-14972, there is disclosed a head unit having a plurality of heads (liquid jet heads) arranged on an array base member (a head installation part), wherein a plurality of nozzles for ejecting droplets is arranged in the plurality of heads. This head unit is provided with a positioning structure which makes a tilted surface of a tilted member have contact with an end portion of a plate member for holding the head, and at the same time, moves the tilted member in a vertical direction with a bolt to thereby fine adjust a position of the head with respect to the array base member.

In the positioning structure described above, since the tilted surface of the tilted member is made to have contact with the end portion of the plate member, the tilted member and the plate member have line contact with each other.

However, since minute asperity due to a processing accuracy and so on exists in the both members, the both members have multipoint contact with each other in a precise sense. In the state of the multipoint contact described above, since errors at respective contact points are apt to accumulate, there is a possibility that it becomes difficult to accurately position the liquid jet head to the head installation part.

The present disclosure is made in view of the problem described above, and has an object of accurately positioning the liquid jet head to the head installation part of the liquid jet recording device.

SUMMARY OF THE INVENTION (1) A positioning structure according to an aspect of the present disclosure is a positioning structure configured to position a liquid jet head to a head installation part of a liquid jet recording device, the positioning structure including a protruding part provided to one of the head installation part and the liquid jet head, and a positioning mechanism which is provided to another of the head installation part and the liquid jet head, and which is configured to adjust a position of the head installation part in a direction along an installation surface of the head installation part with respect to the protruding part, wherein the positioning mechanism includes a contact member configured to have contact with the protruding part, and a displacement mechanism configured to displace the contact member along a displacement axis extending in an oblique direction crossing a direction perpendicular to the installation surface, and one of contact parts of the protruding part and the contact member is formed to have a curved surface shape taking a first intersecting axis crossing the installation surface as a central axis, and another of the contact parts is formed to have a curved surface shape taking a second intersecting axis as a central axis, the second intersecting axis crossing an imaginary plane including the displacement axis and a vertical axis extending in a direction perpendicular to the installation surface, and the second intersecting axis being nonparallel to the first intersecting axis.

According to the positioning structure related to the present aspect, when the contact member is displaced in the oblique direction crossing the direction perpendicular to the installation surface by the displacement mechanism, the protruding part having contact with the contact member is pressed in the direction along the installation surface, and thus, the liquid jet head is displaced with respect to the head installation part. Here, since one of the contact parts is formed to have the curved surface shape taking the first intersecting axis crossing the installation surface as the central axis, and another of the contact parts is formed to have the curved surface shape taking the second intersecting axis as the central axis, wherein the second intersecting axis crosses the imaginary plane including the displacement axis and the vertical axis extending in the direction perpendicular to the installation surface, and the second intersecting axis is nonparallel to the first intersecting axis, and thus, the central axes of the curved surface shapes of the respective contact parts become in a skew positional relationship, the protruding part and the contact member make contact with each other at a single point. Since the protruding part and the contact member make contact with each other at a single point, it is possible to avoid the error due to the multipoint contact between the protruding part and the contact member, and thus, it is possible to accurately position the liquid jet head to the head installation part.

(2) In the positioning structure according to the aspect (1), one of the contact parts may include a first cylindrical surface taking the first intersecting axis as a central axis, and another of the contact parts may include a second cylindrical surface taking the second intersecting axis as a central axis.

In this case, since the one of the contact parts of the protruding part and the contact member has the first cylindrical surface taking the first intersecting axis as the central axis, the other of the contact parts has the second cylindrical surface taking the second intersecting axis as the central axis, and the central axes (the first intersecting axis and the second intersecting axis) of the both parties cross each other, it is possible to make the protruding part and the contact member always have stable contact with each other at the single point.

(3) In the positioning structure according to the aspect (2), the contact part of the protruding part may include the first cylindrical surface extending in the direction perpendicular to the installation surface, and the contact part of the contact member may include the second cylindrical surface extending in parallel to the installation surface.

In this case, since the contact part of the protruding part includes the first cylindrical surface extending in the direction perpendicular to the installation surface, and the contact part of the contact member includes the second cylindrical surface extending in parallel to the installation surface, the protruding part and the contact member always make stable contact with each other at a single point, and at the same time, it is possible to prevent the contact member making contact with the protruding part at a single point from being shifted with respect to the protruding part in the direction along the installation surface.

(4) In the positioning structure according to any one of the aspects (1) through (3), the displacement mechanism may include a guide part which extends in the oblique direction to guide the contact member.

In this case, it is possible to accurately displace the contact member in the oblique direction along the guide part.

(5) In the positioning structure according to the aspect (4), the contact member may have a clamping part configured to clamp the guide part in a direction perpendicular to the displacement axis.

In this case, by clamping the guide part with the clamping part provided to the contact member, it is possible to prevent the contact member from rotating around the displacement axis.

(6) In the positioning structure according to one of the aspects (4) and (5), the displacement mechanism may include a bolt which extends along the displacement axis, and which is configured to screw-feed the contact member, a first support part which is disposed in one end portion of the guide part, which is configured to support a head part of the bolt, and which is provided with a first insertion hole through which a shaft part of the volt is inserted, and a compression spring arranged between the first support part and the contact member.

In this case, when rotating the bolt forming the displacement axis, the contact member which has the clamping part, and which is restricted in the rotation with respect to the guide part is screw-fed. On this occasion, a gap between the first support part and the contact member increases, but the compression spring expands so as to fill the gap, and wherefore, it is possible to prevent the head part of the bolt from lifting from the first support part.

(7) In the positioning structure according to the aspect (6), the displacement mechanism may have a second support part disposed in another end portion of the guide part, and provided with a second insertion hole through which a shaft part of the bolt is inserted.

In this case, since it is possible to shaft-support the both ends of the bolt with the first support part and the second support part by inserting the shaft part of the bolt into the second insertion hole of the second support part, it is possible to suppress the shaft wobbling of the bolt to thereby displace the contact member with high accuracy.

(8) In the positioning structure according to any one of the aspects (1) through (7), the positioning mechanism may be provided with a preloading mechanism configured to preload the protruding part in a direction along the installation surface from an opposite side to a side at which the contact member is arranged.

In this case, by preloading the protruding part with the preloading mechanism to displace the contact member having contact with the protruding part in the preloading direction, it is possible to move the base member following the displacement of the contact member. Since it becomes unnecessary to dispose the contact members and the displacement mechanisms at both sides across the protruding part due to this preloading mechanism, it is possible to achieve simplification, reduction in weight, and reduction in space of the structure of the positioning mechanism.

(9) A liquid jet head according to an aspect of the present disclosure includes either one of the positioning mechanism and the protruding part in the positioning structure according to any one of the aspects (1) through (8).

According to the liquid jet head related to the present aspect, it is possible to obtain the liquid jet head capable of performing accurate printing.

(10) A liquid jet recording device according to an aspect of the present disclosure includes the positioning structure according to any one of the aspects (1) through (8).

According to the liquid jet recording device related to the present aspect, it is possible to obtain the liquid jet recording device capable of performing accurate printing.

(11) A liquid jet recording device according to an aspect of the present disclosure includes a liquid jet head, a carriage on which the liquid jet head is installed, and the positioning structure according to any one of the aspects (1) through (8) configured to position the liquid jet head to the carriage.

According to the liquid jet recording device related to the present aspect, it is possible to accurately position the liquid jet head to the carriage of the liquid jet recording device to perform accurate printing.

According to an aspect of the present disclosure described above, it is possible to accurately position the liquid jet head to the head installation part of the liquid jet recording device.

DETAILED DESCRIPTION OF THE PREFERRED EMBODIMENTS

Figure 1:
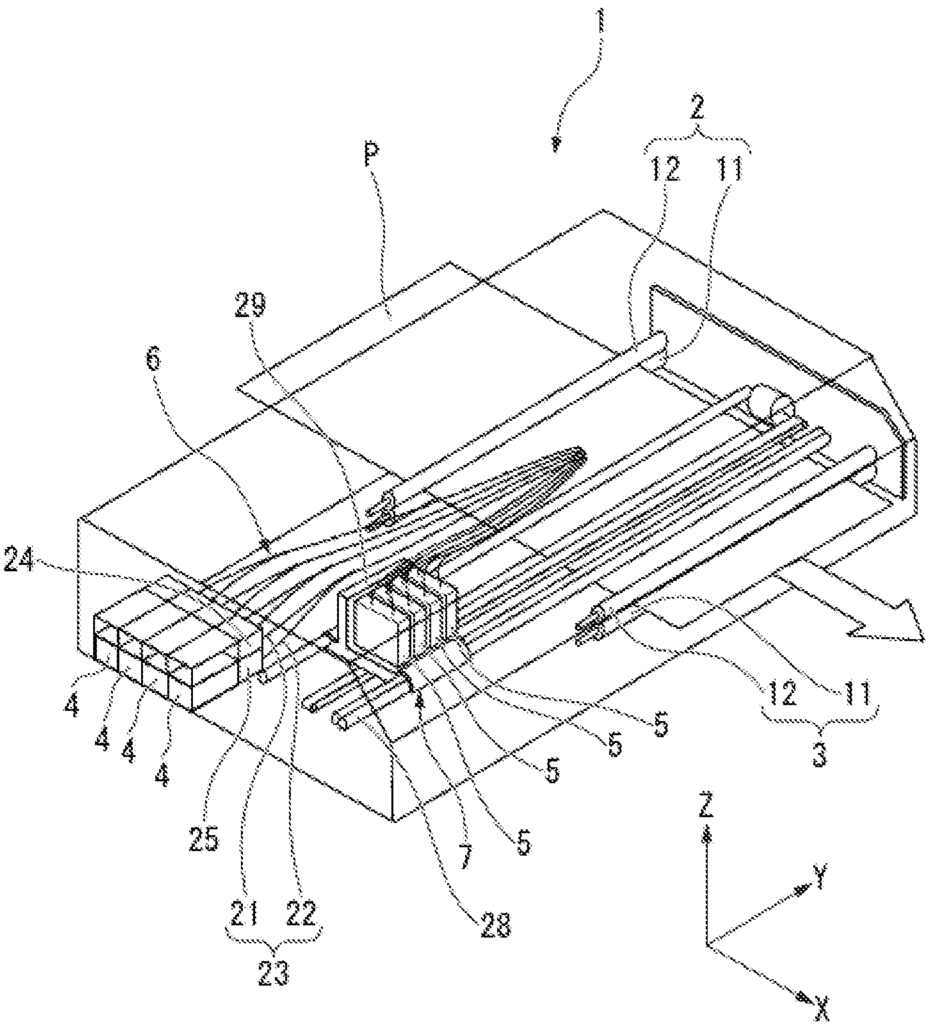
FIG. 1 is a schematic configuration diagram of a printer according to an embodiment.

An embodiment according to the present disclosure will hereinafter be described with reference to the drawings.

In the embodiments and modified examples described hereinafter, constituents corresponding to each other are denoted by the same reference symbols to omit the description thereof in some cases. Further, in the following description, expressions representing relative or absolute arrangement such as "parallel," "perpendicular," "center," and "coaxial" not only represent strictly such arrangements, but also represent the state of being relatively displaced with a tolerance, or an angle or a distance to the extent that the same function can be obtained.

In the following embodiment, the description will be presented citing an inkjet printer (hereinafter simply referred to as a printer) for performing recording on a recording target medium using ink (liquid) as an example. It should be noted that the scale size of each member is arbitrarily modified so as to provide a recognizable size to the member in the drawings used in the following description.

[Printer 1]

FIG. 1 is a schematic configuration diagram of a printer 1 according to the embodiment.

As shown in FIG. 1, the printer 1 (a liquid jet recording device) according to the present embodiment is provided with a pair of conveying mechanisms 2, 3, ink tanks 4, inkjet heads 5 (liquid jet heads), ink circulation mechanisms 6, and a scanning mechanism 7.

In the following explanation, the description is presented using an orthogonal coordinate system of X, Y, and Z as needed. An X direction is a conveying direction (a sub-scanning direction) of a recording target medium P (e.g., paper). A Y direction is a scanning direction (a main-scanning direction) of the scanning mechanism 7. A Z direction is a height direction (a gravitational direction) perpendicular to the X direction and the Y direction. It should be noted that the X direction is a printing width direction of the inkjet head 5.

Further, in the following explanation, the description will be presented defining an arrow side as a positive (+) side, and an opposite side to the arrow as a negative (−) side in the drawings in each of the X direction, the Y direction, and the Z direction. In the present embodiment, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction. There is disposed a plurality of ink tanks 4 which respectively house ink of four colors such as yellow, magenta, cyan, and black.

There is disposed a plurality of inkjet heads 5 which are configured so as to be able to respectively eject the four colors of ink, namely the yellow ink, the magenta ink, the cyan ink, and the black ink in accordance with the ink tanks 4 coupled thereto.

Figure 2:
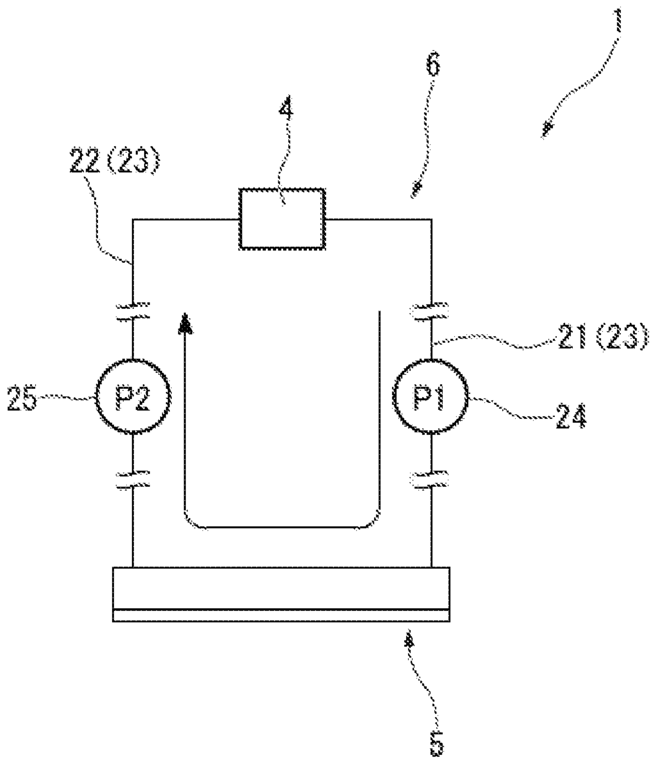
FIG. 2 is a schematic configuration diagram of an inkjet head and an ink circulation mechanism according to the embodiment.

FIG. 2 is a schematic configuration diagram of the inkjet head 5 and the ink circulation mechanism 6 according to the embodiment.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes the inside of the ink supply tube 21 to deliver the ink to the inkjet head 5 through the ink supply tube 21. Thus, the ink supply tube 21 is provided with positive pressure with respect to the inkjet head 5.

The suction pump 25 is depressurizes the inside of the ink discharge tube 22 to suction the ink from the inkjet head 5 through the ink discharge tube 22. Thus, the ink discharge tube 22 is provided with negative pressure with respect to the inkjet head 5. The ink circulates between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, a carriage 29 (a head installation part) movably supported by the guide rail 28, and a drive device for moving the carriage 29. The drive device is constituted by, for example, a motor, a pulley, and a belt.

<Inkjet Heads 5>

The inkjet heads 5 are mounted on the carriage 29. The inkjet heads 5 according to the present embodiment are each an inkjet head of an electromechanical transduction type in which ink is ejected from a head chip including an actuator plate formed of a piezoelectric element made of PZT (lead zirconate titanate) or the like.

In this inkjet head 5, in order to eject the ink, a voltage is applied between electrodes on drive walls of an ejection channel provided to the actuator plate to cause the drive wall to make a thickness-shear deformation. Thus, due to a change in volume of the ejection channel, the ink in the ejection channel is ejected through a nozzle hole. It should be noted that an ejection method of the liquid is not limited to an electromechanical transduction type described above, and it is possible to adopt a charge control method, a pressure vibration method, an electrothermal transduction method, an electrostatic suction method, and so on.

The charge control method is for providing a charge to a material with a charge electrode to eject the material from a nozzle while controlling a flight direction of the material with a deflection electrode. Further, the pressure vibration method is for applying super high pressure to the material to eject the material toward a nozzle tip, and when a control voltage is not applied, the material goes straight to be ejected from the nozzle, and when the control voltage is applied, an electrostatic repelling force is generated between the materials, and the material flies in all directions to be prevented from being ejected from the nozzle.

Further, the electrothermal transduction method is for rapidly vaporizing the material with a heater provided in a space containing the material to generate a bubble, to eject the material in the space with the pressure of the bubble. The electrostatic suction method is for applying minute pressure to a space retaining the material to form a meniscus in the nozzle, and then pulling the material out after applying an electrostatic attractive force in this state. Further, besides the above, it is possible to adopt technologies such as a method using a viscosity alteration of a fluid due to an electric field, or a method of flying the material with a discharge spark.

Figure 3:
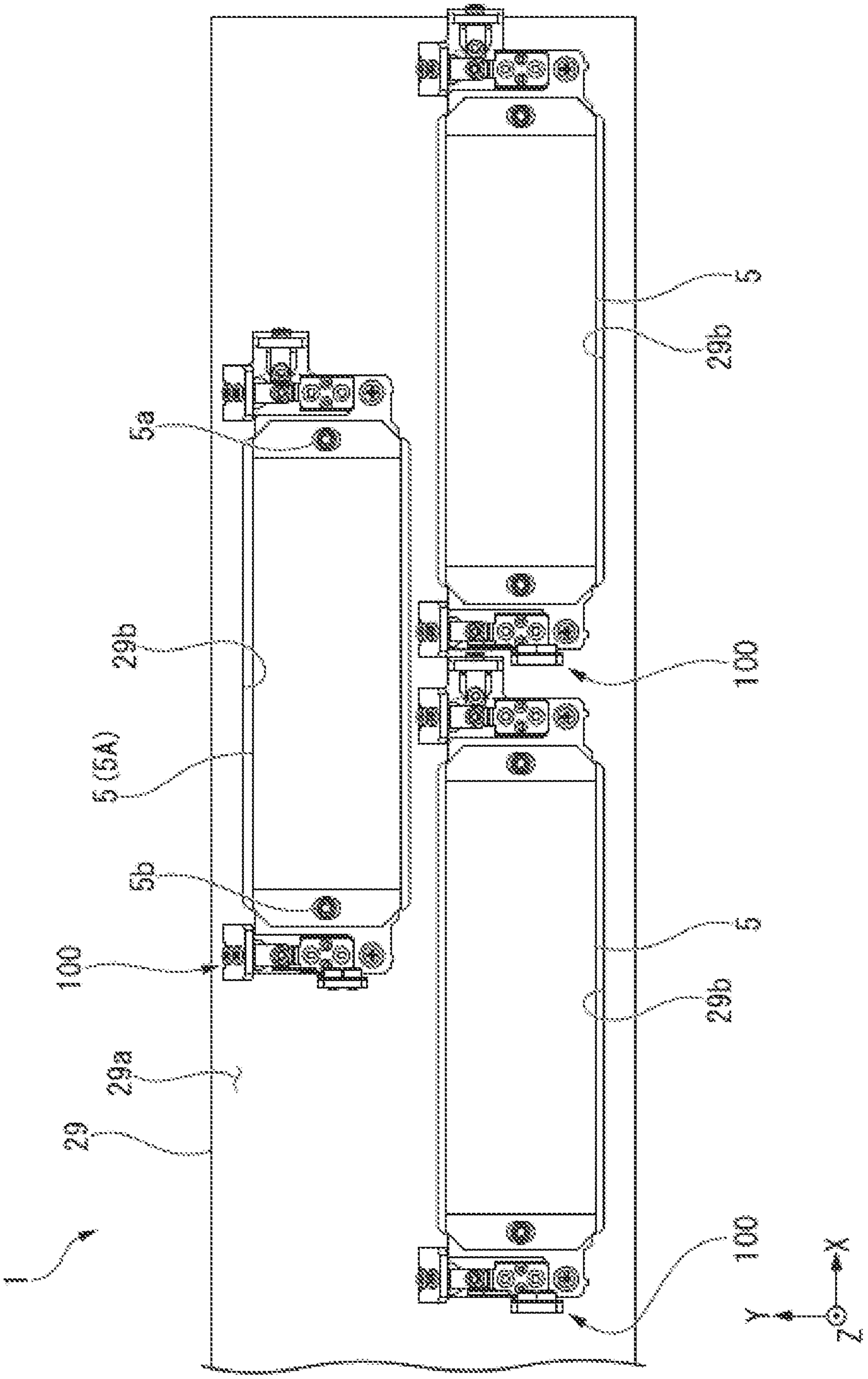
FIG. 3 is a plan view showing an arrangement of the inkjet heads installed in a carriage according to the embodiment.

FIG. 3 is a plan view showing an arrangement of the inkjet heads 5 installed in the carriage 29 according to the embodiment.

As shown in FIG. 3, the plurality of inkjet heads 5 is mounted on an installation surface 29*a* of the carriage 29. The inkjet heads 5 each have a substantially rectangular shape extending in the X direction in the plan view, wherein one side (the +X side) in the X direction thereof, there is disposed an entrance port 5*a* to which the ink supply tube 21 described above is coupled, and on the other side (the −X side) in the X direction thereof, there is disposed an exit port 5*b* to which the ink discharge tube 22 described above is coupled.

The inkjet heads 5 are each installed on the installation surface 29*a* of the carriage 29 in an orientation in which a long side extends in the X direction, and a short side extends in the Y direction. The inkjet heads 5 are installed at a predetermined pitch in the X direction on the installation surface 29*a*. On an upper surface of each of the inkjet heads 5, there is disposed a coupling connector not shown to thereby electrically be coupled to the printer 1 via a cable not shown.

The carriage 29 is provided with insertion holes 29*b* into which a lower end portion of the inkjet head 5 is inserted.

The insertion holes 29*b* are each an elongated hole having a rectangular shape extending in the X direction in the plan view, and each penetrate the installation surface 29*a* of the carriage 29 in a thickness direction (the Z direction). The insertion holes 29*b* are each formed to be one-size larger than the lower end portion of the inkjet head 5 to ensure a clearance for positioning of the inkjet head 5. Each of the inkjet heads 5 are fixed to the carriage 29 while being adjusted in a position in the X direction, a position in the Y direction, and a rotational angle on the X-Y plane by a positioning structure 100 described below.

<Positioning Structure 100>

Figure 4:
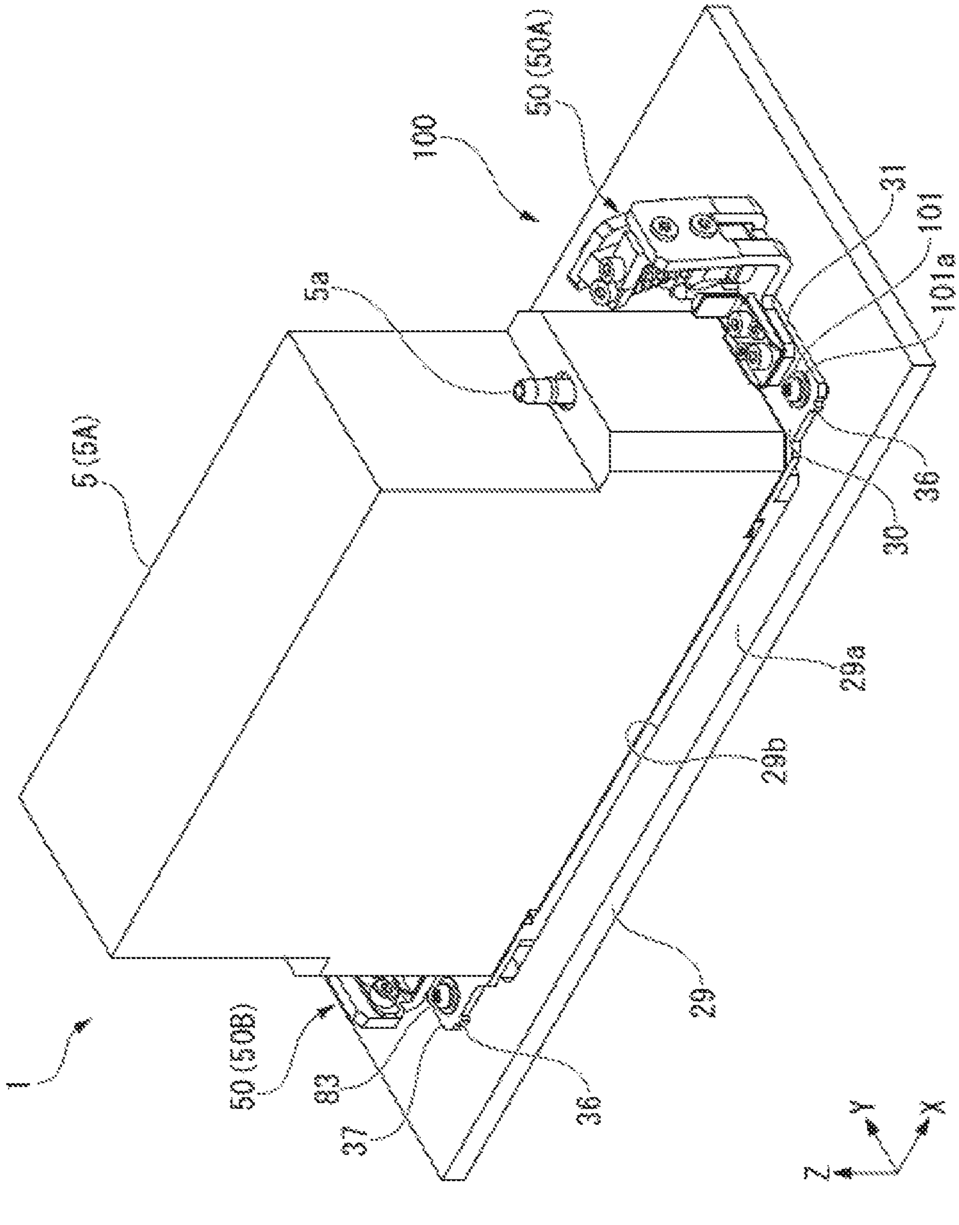
FIG. 4 is a perspective view of a positioning structure of the inkjet head according to the embodiment.
Figure 5:
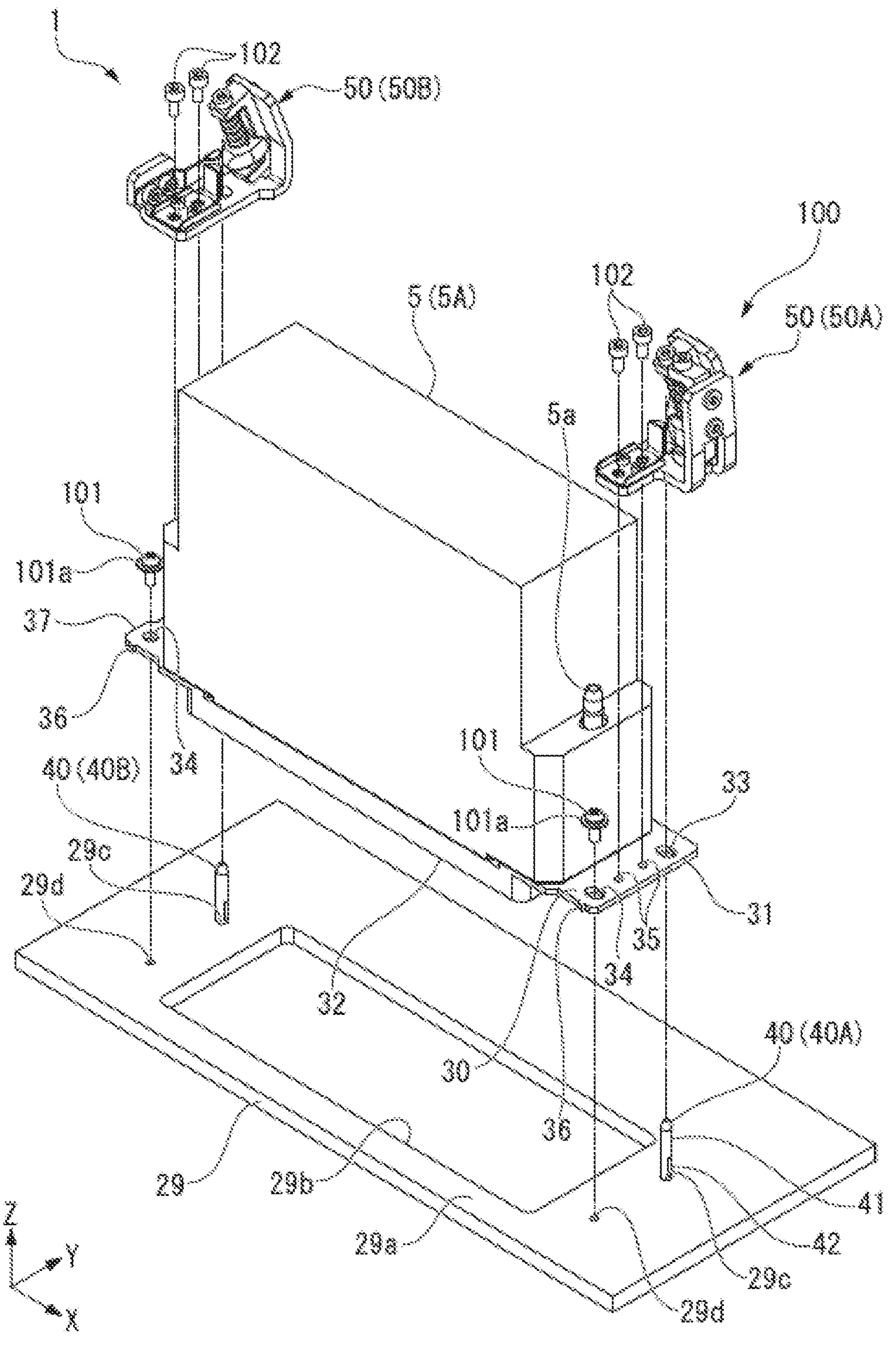
FIG. 5 is an exploded perspective view of the positioning structure of the inkjet head according to the embodiment.
Figure 6:
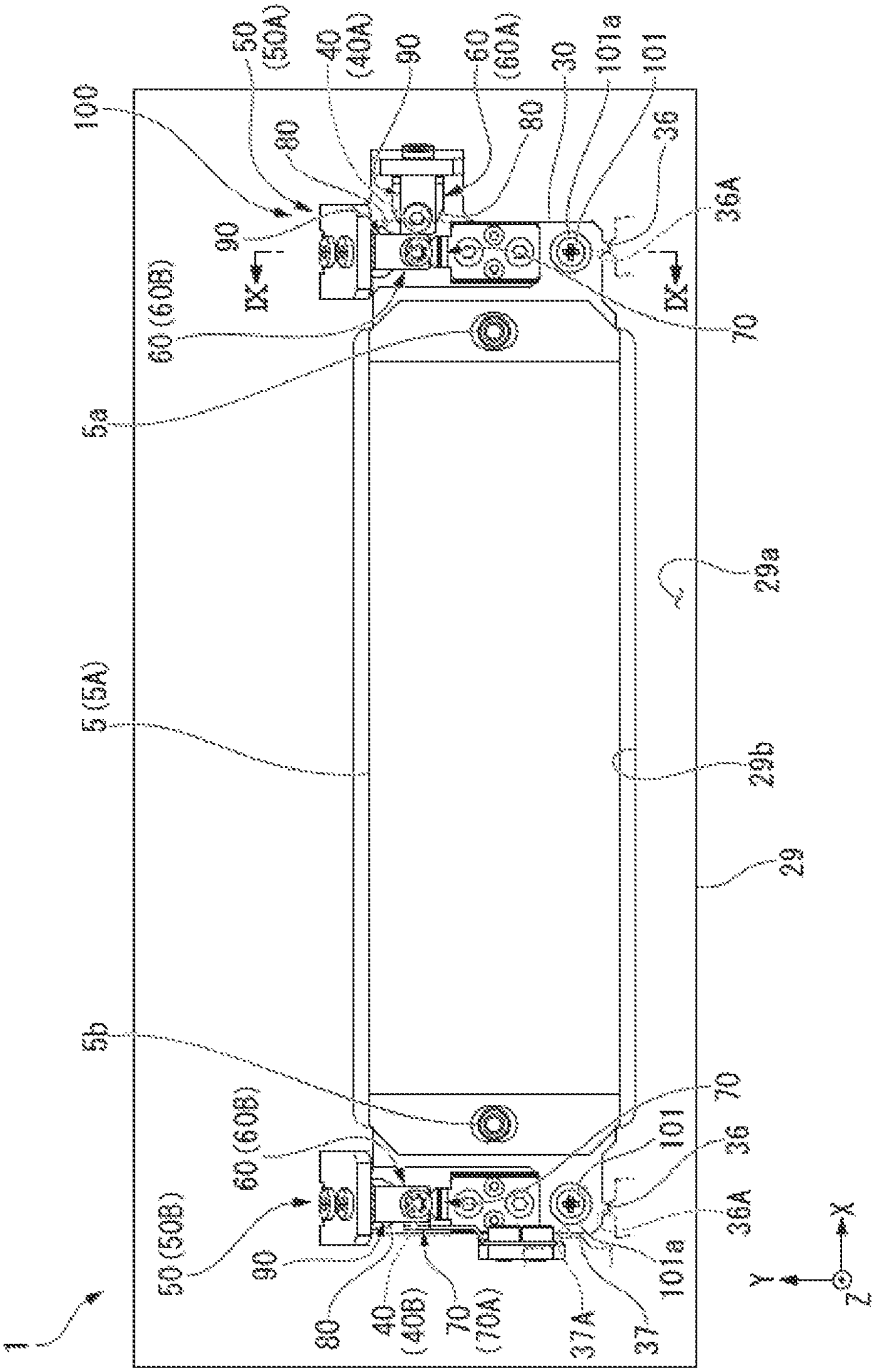
FIG. 6 is a plan view of the positioning structure of the inkjet head according to the embodiment.

FIG. 4 is a perspective view of the positioning structure 100 of the inkjet head 5 according to the embodiment. FIG. 5 is an exploded perspective view of the positioning structure 100 of the inkjet head 5 according to the embodiment. FIG. 6 is a plan view of the positioning structure 100 of the inkjet head 5 according to the embodiment.

As shown in these drawings, the inkjet head 5 is provided with a head main body 5A (a jet section) for jetting the ink, and a base member 30 which supports the head main body 5A, and is installed on the installation surface 29*a* of the carriage 29.

As shown in FIG. 5, the head main body 5A has a rectangular box-like shape, and is provided with a nozzle array not shown for jetting the ink on a lower surface thereof. The base member 30 is coupled to the lower end portion of the head main body 5A. The base member 30 is provided with a plate part 31 to be mounted on the installation surface 29*a* of the carriage 29, and a base part 32 which surrounds the lower end portion of the head main body 5A.

The base part 32 has a rectangular box-like shape opening on an upper side. On a bottom surface of the base part 32, there is formed an elongated hole not shown for exposing the nozzle array of the head main body 5A. The plate part 31 has a plate shape extending from an upper opening edge of the base part 32 toward both sides in the X direction. The plate part 31 is fixed to the installation surface 29*a* of the carriage 29 with screw members 101 each attached to the installation surface 29*a* via a spring washer 101*a*. The installation surface 29*a* of the carriage 29 is provided with fixation holes 29*d* to which the screw members 101 are screwed.

The plate part 31 of the base member 30 is provided with first penetration parts 33 in which positioning pins 40 (protruding parts) are arranged, and second penetration parts 34 in which the screw members 101 are arranged. The first penetration parts 33 each have an elongated hole shape extending in the X direction, and at the same time, are formed to be one-size larger than the positioning pins 40. Further, the second penetration parts 34 each have an elongated hole shape extending in the X direction, and at the same time, are each formed to be one-size larger than a shaft portion of the screw member 101.

The base member 30 is arranged to be able to be adjusted in the fixation position in a direction (an X-Y plane direction) along the installation surface 29*a* of the carriage 29 due to these gaps. Further, between the first penetration part 33 and the second penetration part 34 in the plate part 31, there is a plurality of fixation holes 35 for fixing a positioning unit 50 described later. On an inner wall surface of the fixation hole 35, there is formed an internal thread to which each of screw members 102 for fixing the positioning unit 50 is screwed.

The positioning structure 100 is provided with the positioning pins 40 provided to the carriage 29, and the positioning units 50 which are provided to the inkjet head 5, and which adjust a position of the base member 30 with respect to the positioning pins 40 in a direction along the installation surface 29*a* of the carriage 29. As the positioning pins 40, the positioning structure 100 is provided with a first positioning pin 40A and a second positioning pin 40B arranged in the X direction across the head main body 5A.

The first positioning pin 40A is arranged at the +X side of the head main body 5A. The second positioning pin 40B is arranged at the −X side of the head main body 5A. Further, as the positioning units 50, the positioning structure 100 is provided with a first positioning unit 50A for adjusting a position of the base member 30 with respect to the first positioning pin 40A, and a second positioning unit 50B for adjusting a position of the base member 30 with respect to the second positioning pin 40B.

<Positioning Units 50>

Figure 7:
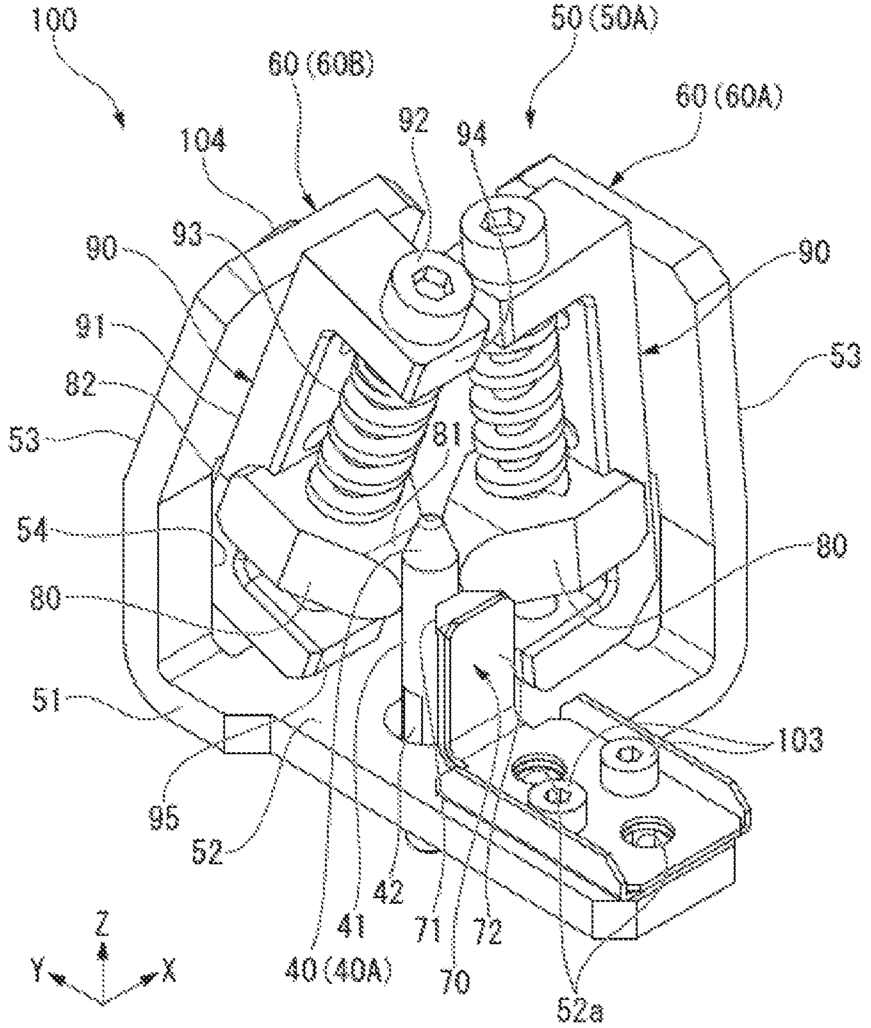
FIG. 7 is a perspective view of a first positioning unit according to the embodiment.
Figure 8:
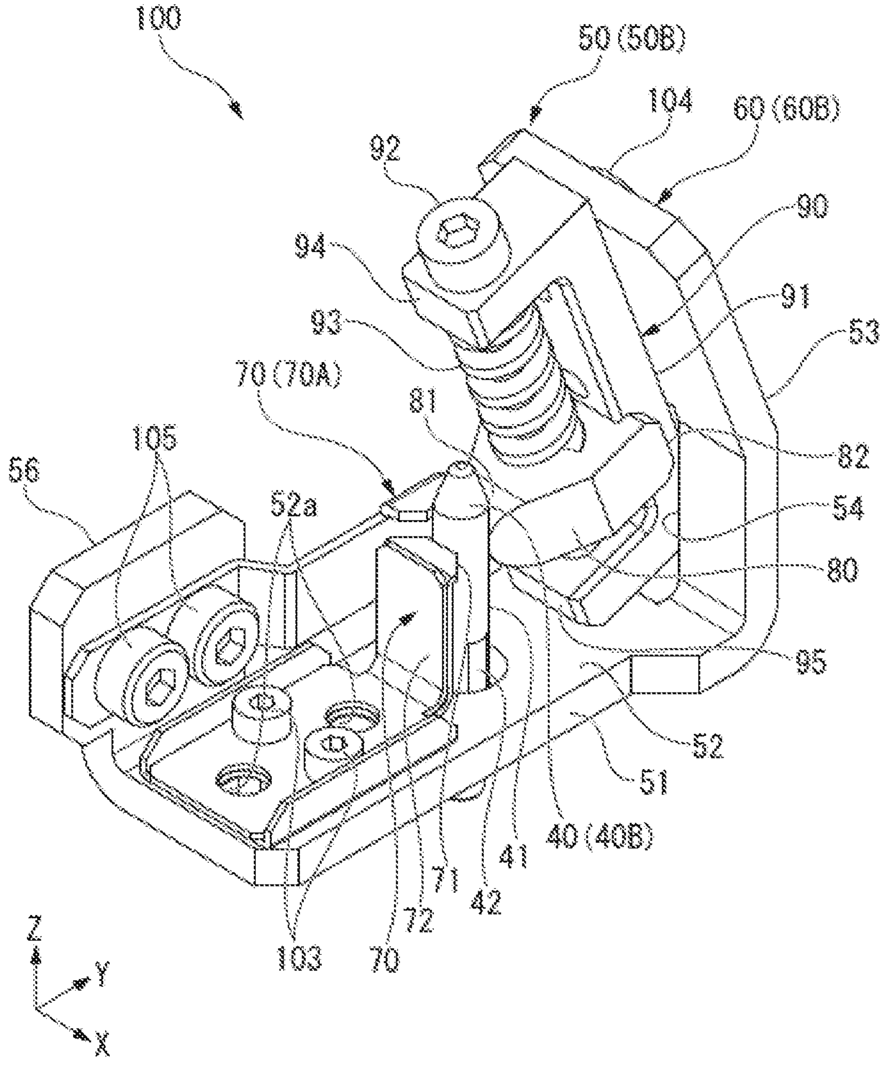
FIG. 8 is a perspective view of a second positioning unit according to the embodiment.
Figure 9:
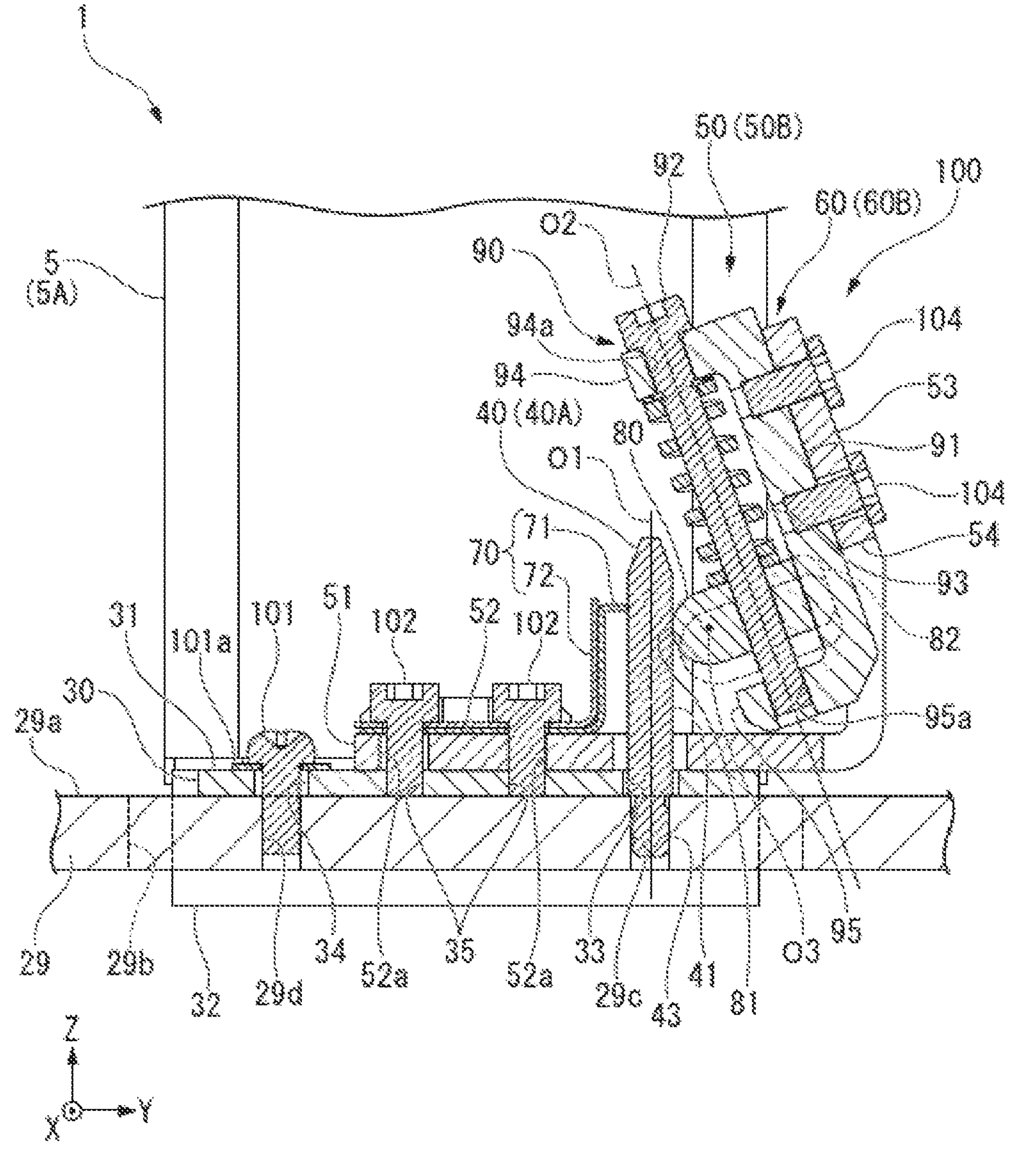
FIG. 9 is a cross-sectional view along an arrow IX-IX shown in FIG. 6.

FIG. 7 is a perspective view of the first positioning unit 50A according to the embodiment. FIG. 8 is a perspective view of the second positioning unit 50B according to the embodiment. FIG. 9 is a cross-sectional view along an arrow IX-IX shown in FIG. 6.

As shown in FIG. 7, the first positioning unit 50A is provided with a frame member 51, and two positioning mechanisms 60 respectively in the X direction and the Y direction supported by the frame member 51. In the following description, first, a basic structure of the positioning mechanisms 60 will be described based on the positioning mechanism 60 in the Y direction (hereinafter referred to as a second positioning mechanism 60B).

The second positioning mechanism 60B adjusts the position of the base member 30 in the Y direction along the installation surface 29*a* with respect to the positioning pin 40 disposed on the installation surface 29*a* of the carriage 29 described above. The second positioning mechanism 60B is provided with a preloading mechanism 70 for preloading the positioning pin 40 in the Y direction along the installation surface 29*a*, a contact member 80 making contact with the positioning pin 40 from an opposite side (the +Y side) to a side (the −Y side) at which the preloading mechanism 70 is arranged in the Y direction in which the preloading mechanism 70 applies the preload, and a displacement mechanism 90 for displacing the contact member 80 in the Y direction in which the preloading mechanism 70 applies the preload.

As shown in FIG. 9, the preloading mechanism 70 is provided with two plate springs 71, 72. The plate spring 71 is cranked, and a tip portion of the plate spring 71 has contact with the −Y side of the positioning pin 40. The plate spring 72 bends to form an L shape, and overlaps a back side of the plate spring 71 to thereby adjust a biasing force of the preloading mechanism 70. It should be noted that it is possible to make two or more plate springs 72 overlap the plate spring 71. Further, when the biasing force of the plate spring 71 is sufficient, it is not required to dispose the plate spring 72.

As shown in FIG. 7, the plate springs 71, 72 are fixed to a bottom part 52 of the frame member 51 with screw members 103. In the vicinity of the screw members 103, there is formed a plurality of third penetrating parts 52*a* penetrating the plate springs 71, 72 and the bottom part 52 of the frame member 51 in the Z direction. As shown in FIG. 9, in the third penetrating parts 52*a*, there are arranged the screw members 102 for fixing the second positioning unit 50B. The screw members 102 are screwed respectively to the fixation holes 35 provided to the plate part 31 of the base member 30. In other words, the second positioning unit 50B (the two positioning mechanisms 60) is detachably attached to the base member 30 with the screw members 102.

The displacement mechanism 90 displaces the contact member 80 having contact with the +Y side of the positioning pin 40 along a displacement axis O2 extending in an oblique direction crossing a direction (the Z direction) perpendicular to the installation surface 29*a*. The frame member 51 is provided with an attachment part 53 to which the displacement mechanism 90 is attached. The attachment part 53 bends at a right angle with the bottom part 52, and further bends at a substantially middle position in the height direction (the Z direction) at the same angle as that of the displacement axis O2 toward the bottom part 52 (toward the positioning pin 40). The attachment part 53 is provided with an opening part 54 for avoiding an interference with a lower end portion of the guide part 91 of the displacement mechanism 90. A back side of the guide part 91 is fixed to the attachment part 53 via screw members 104.

The guide part 91 is an orbital member which extends in an oblique direction along the displacement axis O2 to guide the contact member 80. The guide part 91 has a tilted surface having contact with the back side (the +Y side) of the contact member 80. The contact member 80 has a clamping part 82 for clamping the guide part 91 in a direction (the X direction) perpendicular to the displacement axis O2. In other words, the contact member 80 is arranged to be able to be displaced in the oblique direction along the guide part 91 while sliding on three surfaces, namely the tilted surface and both side surfaces, of the guide part 91.

The displacement mechanism 90 is provided with the guide part 91 described above, a bolt 92, a compression spring 93, a first support part 94, and a second support part 95. The contact member 80 is threadably mounted on the bolt 92 so that screw feeding of the contact member 80 can be achieved. The bolt 92 extends along the displacement axis O2, and screw-feeds the contact member 80 with the rotation around the displacement axis O2. The first support part 94 is disposed in an upper end portion (one end portion) of the guide part 91 to support a head part of the bolt 92. The first support part 94 is provided with a first insertion hole 94*a* through which a shaft part of the bolt 92 is inserted. The first insertion hole 94*a* shaft-supports a portion (a neck portion) which is not provided with the thread in a shaft part of the bolt 92.

The compression spring 93 is, for example, a coil spring arranged around the bolt 92, and intervenes between the first support part 94 and the contact member 80. The compression spring 93 extends and contracts so as to fill a gap between the contact member 80 and the first support part 94 which varies due to the screw-feeding with the bolt 92. The second support part 95 is disposed in a lower end portion (the other end portion) of the guide part 91. The second support part 95 is provided with a second insertion hole 95*a* through which the shaft part of the bolt 92 is inserted. The second insertion hole 95*a* shaft-supports a tip portion which is not provided with the thread in the shaft part of the bolt 92. The guide part 91 described above, the first support part 94, and the second support part 95 are integrally formed to have a substantially C shape as a whole.

The positioning pin 40 erects vertically to the installation surface 29*a* of the carriage 29. The positioning pin 40 is provided with a contact part 41, a chamfered part 42 (see FIG. 7), and a screw part 43 (see FIG. 9). The screw part 43 is disposed in a lower end portion of the positioning pin 40, and is screwed to a fixation hole 29*c* provided to the installation surface 29*a* of the carriage 29. As shown in FIG. 7, the chamfered part 42 is obtained by chamfering a part of a circumferential surface of the positioning pin 40 to form at least two surfaces parallel to each other to make it possible to screw the positioning pin 40. In other words, the positioning pin 40 is detachably attached to the carriage 29. It should be noted that it is possible for the chamfered part 42 to be what is obtained by performing the chamfering to form four surfaces or six surfaces.

As shown in FIG. 7, the positioning pin 40 has the contact part 41 shaped like a curved surface having contact with the contact member 80. Further, the contact member 80 has a contact part 81 shaped like a curved surface having contact with the positioning pin 40. A relationship between the curved surface shapes of the contact parts 41, 81 of the positioning pin 40 and the contact member 80 will hereinafter be described with reference to FIG. 10.

Figure 10:
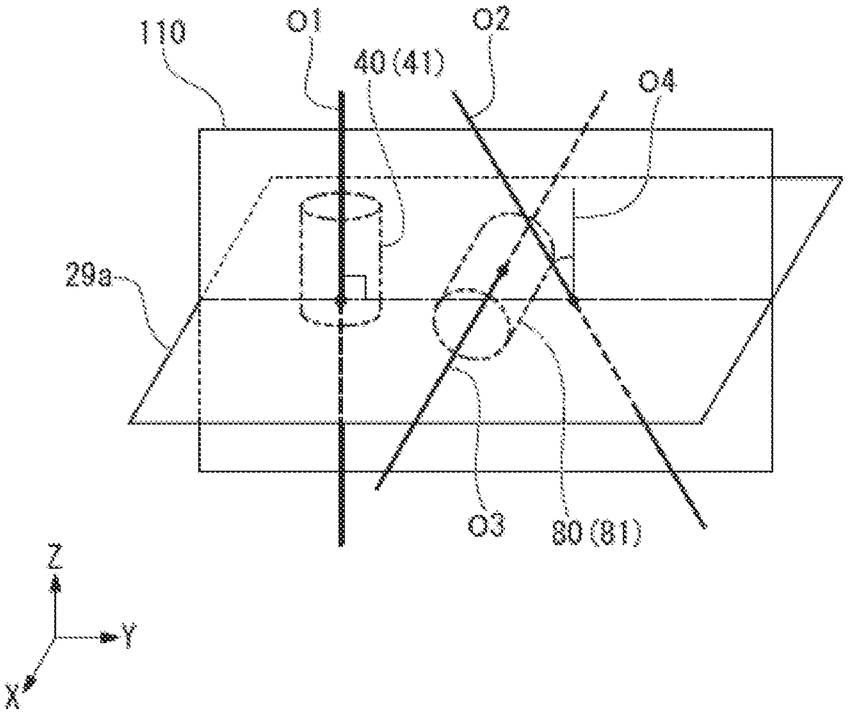
FIG. 10 is a conceptual diagram for explaining curved surface shapes of contact parts according to the embodiment.

FIG. 10 is a conceptual diagram for explaining the curved surface shapes of the contact parts 41, 81 according to the embodiment.

As shown in FIG. 10, the contact part 41 of the positioning pin 40 is formed to have the curved surface shape taking a first intersecting axis O1 crossing the installation surface 29*a* as a central axis. The first intersecting axis O1 in the present embodiment crosses perpendicularly to (at a right angle with) the installation surface 29*a*, but can obliquely cross the installation surface 29*a*.

The contact part 41 in the present embodiment includes a first cylindrical surface taking the first intersecting axis O1 as a central axis. It should be noted that the "first cylindrical surface" means a surface formed to have a constant radius with respect to the first intersecting axis O1. Further, "including the first cylindrical surface" only requires that at least a portion having contact with the contact member 80 is the first cylindrical surface, and can include that a plane (e.g., the chamfered part 42 shown in FIG. 7) or the like exists in other portions than the portion having contact with the contact member 80.

In contrast, the contact part 81 of the contact member 80 is formed to have a curved surface shape taking the second intersecting axis O3, which is nonparallel to the first intersecting axis O1, as a central axis. The second intersecting axis O3 crosses an imaginary plane 110 which includes the displacement axis O2 of the contact member 80 and a vertical axis O4 extending in a direction perpendicular to the installation surface 29*a* (or the first intersecting axis O1 in the present embodiment). The second intersecting axis O3 in the present embodiment extends in parallel to the installation surface 29*a*, and crosses perpendicularly to (at a right angle with) the imaginary plane 110, but can obliquely cross the imaginary plane 110.

The contact part 81 in the present embodiment includes a second cylindrical surface taking the second intersecting axis O3 as a central axis. It should be noted that the "second cylindrical surface" means a surface formed to have a constant radius with respect to the second intersecting axis O3. Further, "including the second cylindrical surface" only requires that at least a portion having contact with the positioning pin 40 is the second cylindrical surface, and can include that planes (e.g., upper and lower parallel surfaces and left and right tilted surfaces of the contact part 81 shown in FIG. 7) or the like exist in other portions than the portion having contact with the positioning pin 40.

Incidentally, when it is supposed that the positioning pin 40 is a square protruding part, the contact part 81 of the contact member 80 is a tilted surface, and the tilted surface is made to have contact with a corner part of the protruding part, the corner part and the tilted surface make line contact with each other. However, since minute asperity caused by processing accuracy or the like exists on the corner part and the tilted surface, the corner part and the tilted surface have contact with each other at a number of points in a precise sense. In the state of the multipoint contact described above, since errors at respective contact points are apt to accumulate, there is a possibility that it becomes difficult to accurately position the inkjet head 5 to the carriage 29.

In contrast, according to the configuration described above, since the central axes (the first intersecting axis O1 and the second intersecting axis O3) of the respective curved surface shapes of the contact parts 41, 81 are in a skew positional relationship, the positioning pin 40 and the contact member 80 have contact with each other at a single point. Since the positioning pin 40 and the contact member 80 have contact with each other at the single point, it is possible to avoid the error due to the multipoint contact between the positioning pin 40 and the contact member 80, and thus, it is possible to accurately position the inkjet head 5 to the carriage 29. Further, since the displacement axis O2 extends in the oblique direction crossing the installation surface 29*a*, the displacement of the contact member 80 in a direction along the installation surface 29*a* per revolution of the bolt 92 decreases, and thus, it is possible to make a microscopic displacement of the contact member 80 with high accuracy.

The basic structure of the positioning mechanism 60 is hereinabove described.

The second positioning unit 50B shown in FIG. 8 is also provided with the same configuration as the positioning mechanism 60 (the second positioning mechanism 60B) in the Y direction of the first positioning unit 50A. It should be noted that a configuration of the positioning mechanism (the first positioning mechanism 60A) in the X direction is disposed in the first positioning unit 50A and the second positioning unit 50B in a separate manner. Although described later in detail, in the first positioning unit 50A shown in FIG. 7, there are disposed the contact member 80 and the displacement mechanism 90 of the first positioning mechanism 60A, and in the second positioning unit 50B shown in FIG. 8, there is disposed the preloading mechanism 70 of the first positioning mechanism 60A. The preloading mechanism 70 of the first positioning mechanism 60A is formed of a single plate spring 70A, and is fixed to a sidewall part 56 erected at the −X side of the frame member 51 via screw members 105.

<Arrangement of Positioning Structure 100>

As shown in FIG. 6, the positioning structure 100 is provided with the first positioning mechanism 60A for adjusting the position in the X direction (a first direction) along the installation surface 29*a* of the base member 30, and the pair of second positioning mechanisms 60B which are arranged at a distance in the X direction to the base member 30, and which respectively adjust the positions in the Y direction (a second direction) perpendicular to the X direction along the installation surface 29*a* of the base member 30.

Further, the positioning structure 100 is provided with the first positioning pin 40A (a first protruding part) and the second positioning pin 40B (a second protruding part) arranged in the X direction across the head main body 5A. One (the second positioning mechanism 60B at the first positioning unit 50A side) of the pair of second positioning mechanisms 60B adjusts the position in the Y direction of the base member 30 to the first positioning pin 40A. Further, the other (the second positioning mechanism 60B at the second positioning unit 50B side) of the pair of second positioning mechanisms 60B adjusts the position in the Y direction of the base member 30 to the second positioning pin 40B.

The preloading mechanism 70 (the plate spring 70A) of the first positioning mechanism 60A is disposed at the second positioning unit 50B side to apply the preload in the X direction to the second positioning pin 40B. Further, the contact member 80 and the displacement mechanism 90 of the first positioning mechanism 60A are disposed at the first positioning unit 50A side, and the contact member 80 makes contact with the first positioning pin 40A from an opposite side (the +X side) to the side (the −X side) at which the preloading mechanism 70 (the plate spring 70A) is arranged in the X direction, and at the same time, is displaced in the X direction.

Each of the positioning mechanisms 60 is supported by the base member 30, and at the same time, at least a part of the positioning mechanism 60 is arranged inside the outer shape of the base member 30 in the plan view of the installation surface 29*a* viewed from the vertical direction (the Z direction). It should be noted that the "inside of the outer shape of the base member 30" means an inside of an outline of the plate part 31 forming the outermost shape of the base member 30 in the plan view of the installation surface 29*a* viewed from the vertical direction (the Z direction).

Further, the positioning pins 40 are also arranged inside the outer shape of the base member 30. In other words, as shown in FIG. 5, the plate part 31 of the base member 30 is provided with the first penetration parts 33 in which the positioning pins 40 are arranged, and which are formed inside the outer shape of the base member 30. In other words, since the positioning pins 40 are arranged so as to penetrate the base member 30, and the base member 30 supports the positioning mechanisms 60, the positioning structure 100 is arranged so that a large portion of the positioning structure 100 overlaps the footprint of the inkjet head 5.

The plate part 31 of the base member 30 is provided with pressing parts 36, 37 (protrusions) each protruding toward a side at which the preloading mechanism 70 receives a reactive force from the positioning pin 40 in a direction in which the preloading mechanism 70 applies the preload. The pressing parts 36 are each disposed so as to protrude toward a side (the −Y side) at which the preloading mechanism 70 receives the reactive force from the positioning pin 40 in the Y direction in which the preloading mechanism 70 of the second positioning mechanism 60B applies the preload. Further, the pressing part 37 is disposed so as to protrude toward a side (the −X side) at which the preloading mechanism 70 receives the reactive force from the positioning pin 40 in the X direction in which the preloading mechanism 70 of the first positioning mechanism 60A applies the preload.

In contrast, the carriage 29 is provided with receiving parts 36A, 37A which the pressing parts 36, 37 are pressed against, respectively. The receiving parts 36A, 37A are for substantially positioning the inkjet head 5 to the carriage 29 in a state in which the pressing parts 36, 37 are pressed. It should be noted that it is desirable to complete the positioning of the inkjet head 5 in the state in which the pressing parts 36, 37 are pressed against the receiving parts 36A, 37A, respectively, but it is necessary to process the pressing parts 36, 37 and the receiving parts 36A, 37A with high accuracy, which is high in cost, and therefore, a fine adjustment of the inkjet head 5 becomes necessary in most cases. Therefore, it is necessary to adjust the position of the inkjet head 5 in a direction along the installation surface 29*a* using the positioning structure 100 described above.

<Method of Positioning Inkjet Head 5>

For example, when translating the inkjet head 5 shown in FIG. 6 toward the +X side with respect to the carriage 29, the bolt 92 of the displacement mechanism 90 of the first positioning mechanism 60A is rotated to displace the contact member 80 toward the −X side with respect to the displacement mechanism 90. Then, the base member 30 to which the displacement mechanism 90 is fixed receives the reactive force from the first positioning pin 40A, and is translated toward the +X side along the installation surface 29*a* of the carriage 29 against the biasing force by the preloading mechanism 70. According to the above, it is possible to translate the inkjet head 5 toward the +X side with respect to the carriage 29.

When translating the inkjet head 5 toward the −X side with respect to the carriage 29, the bolt 92 of the displacement mechanism 90 of the first positioning mechanism 60A is rotated to displace the contact member 80 toward the +X side with respect to the displacement mechanism 90. Then, the base member 30 to which the displacement mechanism 90 is fixed receives the reactive force due to the biasing force by the preloading mechanism 70 from the second positioning pin 40B, and is translated toward the −X side along the installation surface 29*a* of the carriage 29. According to the above, it is possible to translate the inkjet head 5 toward the −X side with respect to the carriage 29.

When translating the inkjet head 5 toward the +Y side with respect to the carriage 29, the bolt 92 of the displacement mechanism 90 of each of the pair of second positioning mechanisms 60B is rotated to displace the contact member 80 toward the −Y side with respect to the displacement mechanism 90. Then, the base member 30 to which the displacement mechanism 90 is fixed receives the reactive force from each of the positioning pins 40, and is translated toward the +Y side along the installation surface 29*a* of the carriage 29 against the biasing force by the preloading mechanism 70. According to the above, it is possible to translate the inkjet head 5 toward the +Y side with respect to the carriage 29.

When translating the inkjet head 5 toward the −Y side with respect to the carriage 29, the bolt 92 of the displacement mechanism 90 of each of the pair of second positioning mechanisms 60B is rotated to displace the contact member 80 toward the +Y side with respect to the displacement mechanism 90. Then, the base member 30 to which the displacement mechanism 90 is fixed receives the reactive force due to the biasing force by the preloading mechanism 70 from each of the positioning pins 40, and is translated toward the −Y side along the installation surface 29*a* of the carriage 29. According to the above, it is possible to translate the inkjet head 5 toward the −Y side with respect to the carriage 29.

When rotating the inkjet head 5 on the X-Y plane with respect to the carriage 29, the bolt 92 of the displacement mechanism 90 of each of the pair of second positioning mechanisms 60B is rotated to make the displacements (adjustment amounts) in the Y direction of the respective contact members 80 different from each other. Then, the base member 30 to which the displacement mechanism 90 is fixed receives the reactive forces different from each other from the respective positioning pins 40, and rotates along the installation surface 29*a* of the carriage 29. According to the above, it is possible to rotate the inkjet head 5 on the X-Y plane with respect to the carriage 29.

As a procedure of positioning the inkjet head 5 to the carriage 29, first, the spring washers 101*a* each intervening between the screw member 101 and the base member 30 are clamped with the screw members 101 to some extent to create a state in which the inkjet head 5 is temporarily fixed to the carriage 29 with the biasing force by the spring washers 101*a* (a temporary fixation step). Then, a rotational angle of the inkjet head 5 is adjusted using the pair of second positioning mechanisms 60B, and then, the inkjet head 5 is translated in the X direction and the Y direction using the first positioning mechanism 60A and the pair of second positioning mechanisms 60B. After the positioning of the inkjet head 5 to the carriage 29 is completed, the screw member 101 are tightened to fix the base member 30 to the carriage 29. According to the above, the installation of the inkjet head 5 to the carriage 29 is completed.

It should be noted that the positioning in the Y direction of the inkjet head 5 can be adjusted by an ink ejection timing. Therefore, when the positioning in the Y direction of the inkjet head 5 is unnecessary, the positioning is completed by two steps, namely the rotation of the inkjet head 5 and the translation in the X direction of the inkjet head 5. When the positioning in the Y direction of the inkjet head 5 is necessary, the positioning is completed by three steps, namely the rotation of the inkjet head 5, the translation in the Y direction of the inkjet head 5, and the translation in the X direction of the inkjet head 5.

Figure 11:
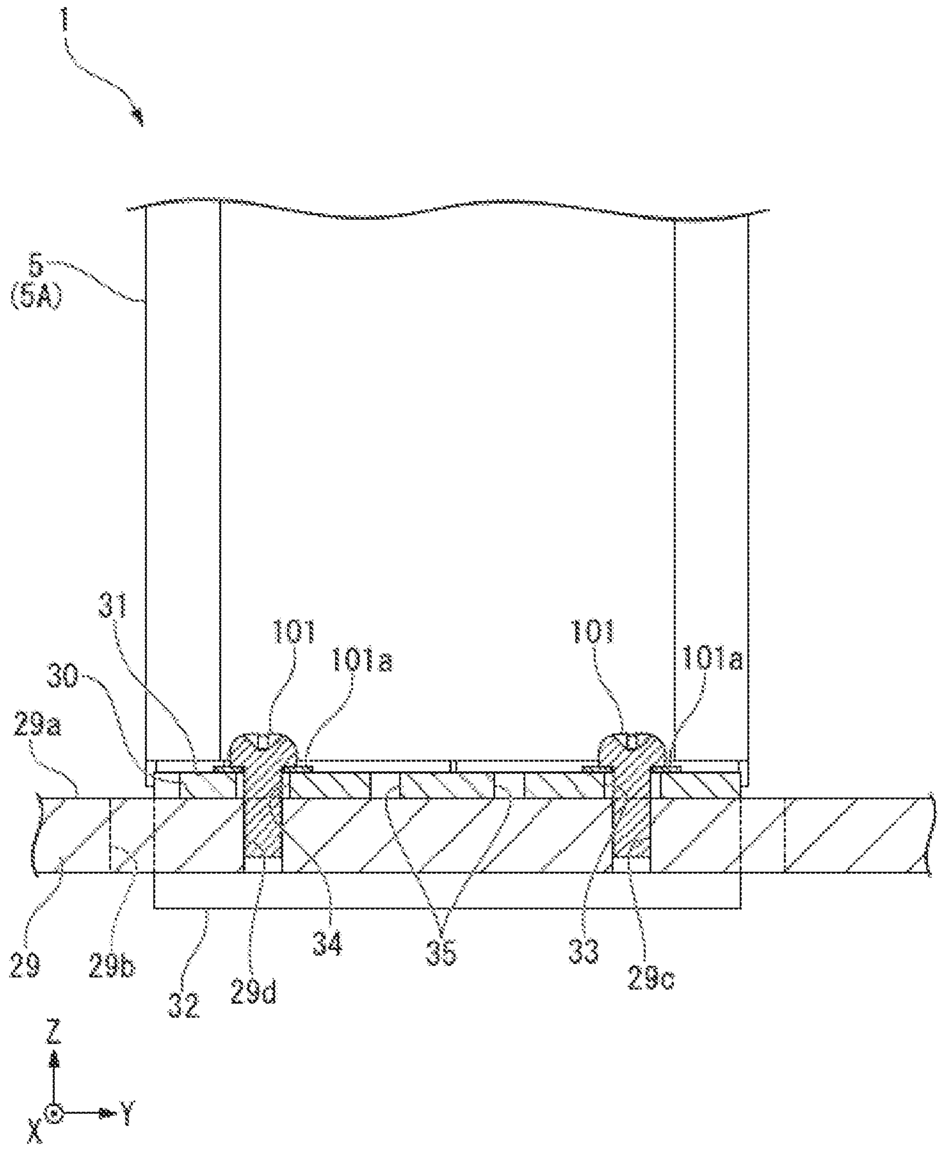
FIG. 11 is an explanatory diagram showing a step subsequent to the positioning of the inkjet head according to the embodiment.

FIG. 11 is an explanatory diagram showing a step subsequent to the positioning of the inkjet head 5 according to the embodiment.

After the positioning of the inkjet head 5 to the carriage 29 is completed, it is possible to detach the positioning structure 100 as shown in FIG. 11. Specifically, the screw members 102 shown in FIG. 9 are detached to detach the positioning unit 50 from the base member 30. Then, the positioning pin 40 provided with the chamfered part 42 is screwed with a tool such as a driver bit to detach the positioning pin 40 from the carriage 29. Lastly, another screw member 101 is screwed into the fixation hole 29*c* to which the positioning pin 40 has once been fixed, to thereby fix the base member 30 to the carriage 29. The positioning structure 100 detached here can be used again for positioning another inkjet head 5.

The positioning structure 100 described above can also adopt a modified example described hereinafter. It should be noted that in the following description, the constituents the same as or substantially the same as the constituents described above are denoted by the same reference symbols, and the explanation thereof will be simplified or omitted.

Figure 12:
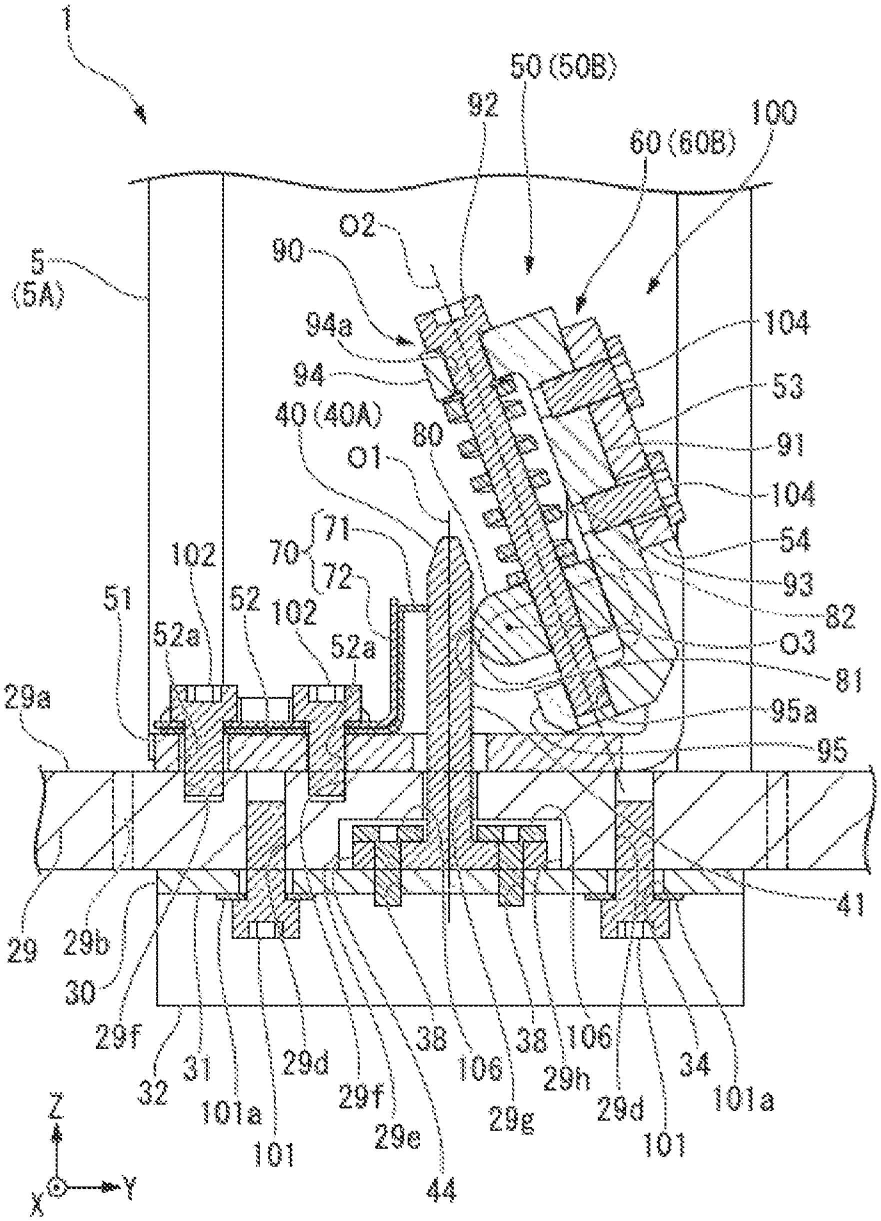
FIG. 12 is a cross-sectional view showing a modified example of the positioning structure according to the embodiment.

FIG. 12 is a cross-sectional view showing the modified example of the positioning structure 100 according to the embodiment.

The positioning structure 100 shown in FIG. 12 is different from the positioning structure 100 described above in the point that the positioning pin 40 is disposed at the base member 30 side of the inkjet head 5, and the positioning mechanism 60 (the positioning unit 50) is disposed at the carriage 29 side.

The base member 30 shown in FIG. 12 is fixed to an installation surface 29*e* facing below the carriage 29 with the screw members 101 each attached via the spring washer 101*a*. The carriage 29 is provided with a fourth penetration part 29*g* in which the positioning pin 40 provided to the base member 30 is arranged so as to penetrate in the Z direction, and a groove part 29*h* which is communicated with the −Z side of the fourth penetration part 29*g* and avoids interference with a flange part 44 of the positioning pin 40 and screw members 106.

The positioning pin 40 has the flange part 44 in an lower end portion, and the flange part 44 is fixed to an upper surface of the base member 30 via the screw members 106. The base member 30 is provided with fixation holes 38 to which the screw members 106 are respectively screwed. On the installation surface 29*a* (an upper surface) of the carriage 29, there are formed fixation holes 29*f* for fixing the positioning unit 50. The positioning unit 50 is detachably attached to the installation surface 29*a* of the carriage 29 with the screw members 102 respectively screwed into the fixation holes 29*f*.

Also in the configuration described above, by displacing the contact member 80 along the displacement axis O2, it is possible to adjust the position of the base member 30 in a direction along the installation surface 29*a*.

According to the present embodiment described above, the following functions and advantages can be obtained.

As shown in FIG. 6, the inkjet head 5 according to the present embodiment is provided with the head main body 5A for jetting the ink, the base member 30 which supports the head main body 5A, and is installed on the installation surface 29*a* of the carriage 29, and the positioning mechanisms 60 each of which adjusts the position of the base member 30 in the direction along the installation surface 29*a* with respect to the positioning pin 40 disposed on the installation surface 29*a*, wherein the positioning mechanisms 60 are supported by the base member 30, and at least a part of the positioning mechanisms 60 is arranged inside the outer shape of the base member 30 in the plan view of the installation surface 29*a* viewed from the vertical direction.

According to this configuration, since the positioning mechanisms 60 for positioning the inkjet head 5 with respect to the positioning pin 40 disposed on the installation surface 29*a* of the carriage 29 are supported by the base member 30 together with the head main body 5A, and at the same time, at least a part of the positioning mechanisms 60 is arranged inside the outer shape of the base member 30 in the plan view of the installation surface 29*a* viewed from the vertical direction, it is possible to arrange the positioning mechanisms 60 so as to overlap the footprint of the inkjet head 5, and thus, it is possible to reduce the area necessary to install the inkjet head 5. Thus, it is possible to suppress the length in the printing width direction (the X direction) of the inkjet head 5 to shorten the length in the printing width direction (the X direction) of the carriage 29 necessary when installing the plurality of inkjet heads 5.

Further, in the inkjet head 5 according to the present embodiment, as shown in FIG. 5, the base member 30 has the first penetration parts 33 inside the outer shape of the base member 30, wherein the positioning pins 40 are respectively angled in the first penetration parts 33. According to this configuration, by providing the first penetration parts 33 to the base member 30, it is possible to arrange the positioning pins 40 inside the footprint of the inkjet head 5, and thus, it is possible to further reduce the area necessary to install the inkjet head 5.

Further, in the inkjet head 5 according to the present embodiment, as shown in FIG. 9, the positioning mechanism 60 is provided with the preloading mechanism 70 for preloading the positioning pin 40 in the direction along the installation surface 29*a*, the contact member 80 making contact with the positioning pin 40 from the opposite side to the side at which the preloading mechanism 70 is arranged in the direction in which the preloading mechanism 70 applies the preload, and the displacement mechanism 90 for displacing the contact member 80 in the direction in which the preloading mechanism 70 applies the preload. According to this configuration, by preloading the positioning pin 40 with the preloading mechanism 70 to displace the contact member 80 having contact with the positioning pin 40 in the preloading direction, it is possible to move the base member 30 following the displacement of the contact member 80. Since it becomes unnecessary to dispose the contact members 80 and the displacement mechanisms 90 at both sides across the positioning pin 40 due to the preloading mechanism 70, it is possible to achieve simplification, reduction in weight, and reduction in space of the structure of the positioning mechanism 60.

Further, in the inkjet head 5 according to the present embodiment, the positioning mechanism 60 (the positioning unit 50) is detachably attached to the base member 30. According to this configuration, since it is possible to detach the positioning mechanism 60 (the positioning unit 50) from the base member 30 after the positioning and the installation of the inkjet head 5 are completed, and then use the positioning mechanism 60 thus detached for positioning another inkjet head 5, this configuration can make a contribution to the reduction in cost.

Further, in the inkjet head 5 according to the present embodiment, as shown in FIG. 6, the positioning mechanisms 60 include the first positioning mechanism 60A for adjusting the position in the X direction (the first direction) along the installation surface 29*a* of the base member 30, and the pair of second positioning mechanisms 60B which are arranged at a distance in the X direction to the base member 30, and which respectively adjust the positions in the Y direction (the second direction) perpendicular to the X direction along the installation surface 29*a* of the base member 30. According to this configuration, it is possible to adjust the positions in the X direction and the Y direction along the installation surface 29*a* of the base member 30 using the first positioning mechanism 60A and the second positioning mechanisms 60B. Further, by making the adjustment amount of the position in the Y direction different between the pair of second positioning mechanisms 60B, it is possible to adjust the rotational angle of the base member 30.

Further, in the inkjet head 5 according to the present embodiment, the positioning pins 40 include the first positioning pin 40A and the second positioning pin 40B arranged across the head main body 5A in the X direction, wherein one (the second positioning mechanism 60B at the first positioning unit 50A side) of the pair of second positioning mechanisms 60B adjusts the position of the base member 30 in the Y direction with respect to one (the first positioning pin 40A) of the first positioning pin 40A and the second positioning pin 40B, and the other (the second positioning mechanism 60B at the second positing unit 50B side) of the pair of second positioning mechanisms 60B adjusts the position of the base member 30 in the Y direction with respect to the other (the second positioning pin 40B) of the first positioning pin 40A and the second positioning pin 40B. According to this configuration, since it is possible to position the inkjet head 5 with the two positioning pins 40 without disposing three positioning pins 40 so as to correspond respectively to the three positioning mechanisms 60, namely the first positioning mechanism 60A and the pair of second positioning mechanisms 60B, it is possible to decrease the number of the positioning pins 40 to be arranged in the footprint of the inkjet head 5 to thereby further reduce the area necessary to install the inkjet head 5.

Further, in the inkjet head 5 according to the present embodiment, the first positioning mechanism 60A is provided with the preloading mechanism 70 for applying the preload in the X direction to one (the second positioning pin 40B) of the first positioning pin 40A and the second positioning pin 40B, the contact member 80 making contact with the other (the first positioning pin 40A) of the first positioning pin 40A and the second positioning pin 40B from the opposite side to the side at which the preloading mechanism 70 is arranged in the X direction, and the displacement mechanism 90 for displacing the contact member 80 in the X direction. According to this configuration, by arranging the preloading mechanism 70 at the opposite side across the head main body 5A from the contact member 80 and the displacement mechanism 90, it is possible to suppress the length in the printing width direction (the X direction) of the base member 30 compared to when arranging all of the preloading mechanism 70, the contact member 80, and the displacement mechanism 90 at one side of the head main body 5A. Thus, it is possible to ensure the degree of freedom of the installation space of the inkjet head 5.

Further, in the inkjet head 5 according to the present embodiment, the outer shape of the base member 30 is provided with the pressing parts 36, 37 each protruding toward the side at which the preloading mechanism 70 receives the reactive force from the positioning pin 40 in the direction in which the preloading mechanism 70 applies the preload. According to this configuration, when the accuracy of the pressing parts 36, 37 is high, it is possible to easily position the inkjet head 5 by pressing the pressing parts 36, 37 against the carriage 29 with the reactive force received by the preloading mechanism 70 from the positioning pin 40. Further, when the accuracy of the pressing parts 36, 37 is insufficient, by displacing the contact member 80 toward the opposite side to the pressing direction of the pressing parts 36, 37 to adjust the position of the inkjet head 5, it is possible to position the inkjet head 5.

The printer 1 according to the present embodiment is provided with the inkjet heads 5 described above, and the carriage 29 as the installation target of the inkjet heads 5. According to this printer 1, there can be obtained the printer 1 which is capable of reducing the area necessary to install the inkjet heads 5, which is compact in size, and which is capable of performing accurate printing.

Further, in the printer 1 according to the present embodiment, the positioning pins 40 are detachably attached to the carriage 29. According to this configuration, since it is possible to detach the positioning pins 40 from the carriage 29 after the positioning and the installation of the inkjet head 5 are completed, and then use the positioning pins 40 thus detached for positioning another inkjet head 5, it becomes possible to use the positioning pins 40 for many occasions, which can make a contribution to the reduction in cost. Further, it is possible to fix the base member 30 to the carriage 29 using the places where the positioning pins 40 are detached.

As shown in FIG. 12, the printer 1 according to the modified example of the present embodiment is provided with the inkjet heads 5 and the carriage 29 on which the inkjet heads 5 are mounted, and the inkjet heads 5 are each provided with the head main body 5A for jetting the ink, the base member 30 which supports the head main body 5A, and is installed on the installation surface 29*a* of the carriage 29, and the positioning pins 40 protruding from the base member 30 toward the carriage 29, the carriage 29 is provided with the positioning mechanisms 60 each of which adjusts the position of the base member 30 in the direction along the installation surface 29*e* with respect to the positioning pins 40, and at least a part of the positioning mechanisms 60 is arranged inside the outer shape of the base member 30 in the plan view of the installation surface 29*a* viewed from the vertical direction.

According to the printer 1, since the inkjet head 5 is provided with the positioning pins 40, the carriage 29 is provided with the positioning mechanisms 60, and at least a part of the positioning mechanisms 60 is arranged inside the outer shape of the base member 30 of the inkjet head 5 in the plan view of the installation surface 29*e* viewed from the vertical direction, it is possible to arrange the positioning mechanisms 60 so as to overlap the footprint of the inkjet head 5, and thus, it is possible to decrease the area necessary to install the inkjet head 5. Thus, it is possible to suppress the length in the printing width direction of the inkjet head 5 to shorten the length in the printing width direction of the carriage 29 necessary when installing the plurality of inkjet heads 5.

Further, according to the present embodiment described above, the following functions and advantages can be obtained.

The positioning structure 100 according to the present embodiment is the positioning structure 100 for positioning the inkjet head 5 to the carriage 29 of the printer 1, and is provided with the positioning pins 40 provided to one of the carriage 29 and the inkjet head 5, and the positioning mechanisms 60 which are provided to the other of the carriage 29 and the inkjet head 5, and which adjust the positions in the direction along the installation surface 29*a* of the carriage 29 with respect to the positioning pins 40, wherein the positioning mechanisms 60 each include the contact member 80 having contact with the positioning pin 40, and the displacement mechanism 90 for displacing the contact member 80 along the displacement axis O2 extending in the oblique direction crossing the direction perpendicular to the installation surface 29*a*, one of the contact parts 41, 81 of the positioning pin 40 and the contact member 80 is formed to have the curved surface shape taking the first intersecting axis O1 crossing the installation surface 29*a* as the central axis, and the other of the contact parts 41, 81 is formed to have the curved surface shape taking the second intersecting axis O3 as the central axis, the second intersecting axis O3 crossing the imaginary plane 110 (see FIG. 10) including the displacement axis O2 and the vertical axis O4 (the first intersecting axis O1) extending in the direction perpendicular to the installation surface 29*a*, and the second intersecting axis O3 being nonparallel to the first intersecting axis O1.

According to this configuration, when the contact member 80 is displaced in the oblique direction crossing the direction perpendicular to the installation surface 29*a* due to the displacement mechanism 90, the positioning pin 40 having contact with the contact member 80 is pressed in the direction along the installation surface 29*a*, and thus, the inkjet head 5 is displaced with respect to the carriage 29. Here, since one of the contact parts 41, 81 is formed to have the curved surface shape taking the first intersecting axis O1 crossing the installation surface 29*a* as the central axis, and at the same time, the other of the contact parts 41, 81 is formed to have the curved surface shape taking the second intersecting axis O3 as the central axis, the second intersecting axis O3 crossing the imaginary plane 110 including the displacement axis O2 and the vertical axis extending in the direction perpendicular to the installation surface 29*a*, and the second intersecting axis O3 being nonparallel to the first intersecting axis O1, and the central axes of the respective curved surface shapes of the contact parts 41, 81 become in the skew positional relationship, the positioning pin 40 and the contact member 80 have contact with each other at a single point. Since the positioning pin 40 and the contact member 80 have contact with each other at the single point, it is possible to avoid the error due to the multipoint contact between the positioning pin 40 and the contact member 80, and thus, it is possible to accurately position the inkjet head 5 to the carriage 29.

Further, in the positioning structure 100 according to the present embodiment, one (the contact part 41) of the contact parts 41, 81 includes the first cylindrical surface taking the first intersecting axis O1 as the central axis, and the other (the contact part 81) of the contact parts 41, 81 includes the second cylindrical surface taking the second intersecting axis O3 as the central axis. According to this configuration, since the contact part 41 of the positioning pin 40 as the one of the contact parts has the first cylindrical surface taking the first intersecting axis O1 as the central axis, the contact part 81 of the contact member 80 has the second cylindrical surface taking the second intersecting axis O3 as the central axis, and the central axes (the first intersecting axis O1 and the second intersecting axis O3) of the both parties cross each other, it is possible to make the positioning pin 40 and the contact member 80 always have stable contact with each other at the single point.

Further, in the positioning structure 100 according to the present embodiment, the contact part 41 of the positioning pin 40 includes the first cylindrical surface extending in the direction perpendicular to the installation surface 29*a*, and the contact part 81 of the contact member 80 includes the second cylindrical surface extending in parallel to the installation surface 29*a*. According to this configuration, since the contact part 41 of the positioning pin 40 includes the first cylindrical surface extending in the direction perpendicular to the installation surface 29*a*, and the contact part 81 of the contact member 80 includes the second cylindrical surface extending in parallel to the installation surface 29*a*, the positioning pin 40 and the contact member 80 always make stable contact with each other at the single point, and at the same time, it is possible to prevent the contact member 80 having contact with the positioning pin 40 at the single point from being shifted in the direction (the X-Y plane direction) along the installation surface 29*a* with respect to the positioning pin 40.

Further, in the positioning structure 100 according to the present embodiment, the displacement mechanism 90 has the guide part 91 which extends in the oblique direction along the displacement axis O2 to guide the contact member 80. According to this configuration, it is possible to accurately displace the contact member 80 in the oblique direction along the guide part 91.

Further, in the positioning structure 100 according to the present embodiment, the contact member 80 has the clamping part 82 for clamping the guide part 91 in the direction perpendicular to the displacement axis O2. According to this configuration, by clamping the guide part 91 with the clamping part 82 provided to the contact member 80, it is possible to prevent the contact member 80 from rotating around the displacement axis O2.

Further, in the positioning structure 100 according to the present embodiment, the displacement mechanism 90 includes the bolt 92 which extends along the displacement axis O2, and which screw-feeds the contact member 80, the first support part 94 which is disposed in one end portion of the guide part 91, which supports the head part of the bolt 92, and which is provided with the first insertion hole 94*a* through which the shaft part of the volt 92 is inserted, and the compression spring 93 arranged between the first support part 94 and the contact member 80. According to this configuration, when rotating the bolt 92 forming the displacement axis O2, the contact member 80 which has the clamping part 82, and which is restricted in the rotation with respect to the guide part 91 is screw-fed. On this occasion, a gap between the first support part 94 and the contact member 80 increases, but the compression spring 93 expands so as to fill the gap, and wherefore, it is possible to prevent the head part of the bolt 92 from lifting from the first support part 94.

Further, in the positioning structure 100 according to the present embodiment, the displacement mechanism 90 has the second support part 95 which is disposed in the other end portion of the guide part 91, and which is provided with the second insertion hole 95*a* through which the shaft part of the bolt 92 is inserted. According to this configuration, since it is possible to shaft-support the both ends of the bolt 92 with the first support part and the second support part 95 by inserting the shaft part of the bolt 92 into the second insertion hole 95*a* of the second support part 95, it is possible to suppress the shaft wobbling of the bolt 92 to thereby displace the contact member 80 with high accuracy.

Further, in the positioning structure 100 according to the present embodiment, the positioning mechanism 60 is provided with the preloading mechanism 70 for applying the preload in the direction along the installation surface 29*a* to the positioning pin 40 from the opposite side to the side at which the contact member 80 is arranged. According to this configuration, by preloading the positioning pin 40 with the preloading mechanism 70 to displace the contact member 80 having contact with the positioning pin 40 in the preloading direction, it is possible to move the base member 30 following the displacement of the contact member 80. Since it becomes unnecessary to dispose the contact members 80 and the displacement mechanisms 90 at both sides across the positioning pin 40 due to this preloading mechanism 70, it is possible to achieve simplification, reduction in weight, and reduction in space of the structure of the positioning mechanism 60.

The inkjet head 5 according to the present embodiment is provided with either one of the positioning mechanism 60 and the positioning pin 40 of the positioning structure 100 described above. According to this inkjet head 5, it is possible to obtain the inkjet head 5 capable of performing accurate printing.

The printer 1 according to the present embodiment is provided with the positioning structure 100 described above. According to this printer 1, it is possible to perform accurate printing.

The printer 1 according to the present embodiment is provided with the inkjet heads 5, the carriage 29 on which the inkjet heads 5 are installed, and the positioning structure 100 described above for positioning the inkjet head 5 to the carriage 29. According to this printer 1, it is possible to accurately position the inkjet head 5 to the carriage 29 of the printer 1 to perform accurate printing.

Although the preferred embodiment of the present disclosure is hereinabove described, it should be understood that this is an illustrative description of the present disclosure, and should not be considered as a limitation. Modification such as addition, omission, and displacement can be implemented within the scope or the spirit of the present disclosure. Therefore, the present disclosure should not be assumed to be limited by the above description, but is limited by the appended claims.

For example, in the embodiment described above, there is illustrated the detachable positioning pin 40 as the protruding part of the positioning structure 100, but this configuration is not a limitation. The protruding part of the positioning structure 100 can also be integrally provided to the inkjet head 5 or the carriage 29, and can be not detachable.

Further, for example, in the embodiment described above, there is illustrated the positioning unit 50 in which a part of the first positioning mechanism 60A and the second positioning mechanism 60B are unitized, but this configuration is not a limitation. It is possible for the first positioning mechanism 60A and the second positioning mechanism 60B to individually be attached to the inkjet head 5 or the carriage 29.

Further, for example, in the embodiment described above, there is illustrated an aspect in which the contact part 41 of the positioning pin 40 and the contact part 81 of the contact member 80 each have the cylindrical surface, but this configuration is not a limitation. The contact parts 41, 81 can have any curved surface shapes providing the contact parts 41, 81 have contact with each other at a single point. In other words, the "curved surface shape" is not only the curved surface which is formed with a constant radius from the central axis, and the cross-sectional shape of which is a true circle, but can be, for example, a curved surface the cross-sectional shape of which is an elliptical shape, or a curved surface which can be defined by a quadratic function.

Further, for example, in the embodiment described above, the description is presented citing the inkjet printer as an example of the liquid jet recording device, but the liquid jet recording device is not limited to the printer. For example, a facsimile machine, an on-demand printing machine, and so on can also be adopted.

In the embodiment described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiment described above, there is described a case when the recording target medium P is paper, but this configuration is not a limitation. The recording target medium P is not limited to paper, but can also be a metal material or a resin material, and can also be food or the like.

In the embodiment described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiment described above, there is described the configuration in which the Z direction coincides with the gravitational direction, but this configuration is not a limitation, and it is also possible to set the Z direction along the horizontal direction.

In the embodiment described above, there is described the configuration in which the first direction coincides with the X direction, and the second direction coincides with the Y direction, but this configuration is not a limitation. The first direction and the second direction can be defined differently from the X direction and the Y direction.

What is claimed is:

1. A positioning structure configured to position a liquid jet head to a head installation part of a liquid jet recording device, the positioning structure comprising:
- a protruding part provided to one of the head installation part and the liquid jet head; and
- a positioning mechanism which is provided to another of the head installation part and the liquid jet head, and which is configured to adjust a position of the head installation part in a direction along an installation surface thereof with respect to the protruding part, wherein
- the positioning mechanism includes:
  - a contact member configured to have contact with the protruding part; and
  - a displacement mechanism configured to displace the contact member along a displacement axis extending in an oblique direction crossing a direction perpendicular to the installation surface, and
- one of contact parts of the protruding part and the contact member is formed to have a curved surface shape taking a first intersecting axis crossing the installation surface as a central axis, and another of the contact parts is formed to have a curved surface shape taking a second intersecting axis as a central axis, the second intersecting axis crossing an imaginary plane including the displacement axis and a vertical axis extending in a direction perpendicular to the installation surface, and the second intersecting axis being nonparallel to the first intersecting axis.

2. The positioning structure according to claim 1, wherein
- one of the contact parts includes a first cylindrical surface taking the first intersecting axis as a central axis, and
- another of the contact parts includes a second cylindrical surface taking the second intersecting axis as a central axis.

3. The positioning structure according to claim 2, wherein
- the contact part of the protruding part includes the first cylindrical surface extending in the direction perpendicular to the installation surface, and
- the contact part of the contact member includes the second cylindrical surface extending in parallel to the installation surface.

4. The positioning structure according to claim 1, wherein the displacement mechanism includes a guide part which extends in the oblique direction to guide the contact member.

5. The positioning structure according to claim 4, wherein
- the contact member has a clamping part configured to clamp the guide part in a direction perpendicular to the displacement axis.

6. The positioning structure according to claim 4, wherein
- the displacement mechanism includes:
  - a bolt which extends along the displacement axis, and which is configured to screw-feed the contact member,
  - a first support part which is disposed in one end portion of the guide part, which is configured to support a head part of the bolt, and which is provided with a first insertion hole through which a shaft part of the volt is inserted; and
  - a compression spring arranged between the first support part and the contact member.

7. The positioning structure according to claim 6, wherein
- the displacement mechanism has a second support part disposed in another end portion of the guide part, and provided with a second insertion hole through which a shaft part of the bolt is inserted.

8. The positioning structure according to claim 1, wherein the positioning mechanism is provided with a preloading mechanism configured to preload the protruding part in a direction along the installation surface from an opposite side to a side at which the contact member is arranged.

9. A liquid jet head comprising either one of the positioning mechanism and the protruding part in the positioning structure according to claim 1.

10. A liquid jet recording device comprising the positioning structure according to claim 1.

11. A liquid jet recording device comprising:

a liquid jet head;

a carriage on which the liquid jet head is installed; and the positioning structure according to claim 1 configured to position the liquid jet head to the carriage.

* * * * *